(12) United States Patent
Anderson (10) Patent No.: US 6,509,847 B1
(45) Date of Patent: Jan. 21, 2003

(54) PRESSURE PASSWORD INPUT DEVICE AND METHOD

(75) Inventor: Glen J. Anderson, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/388,284

(22) Filed: Sep. 1, 1999

(51) Int. Cl.⁷ .............................................. H03M 11/00
(52) U.S. Cl. .......................... 341/34; 341/20; 341/22; 178/18.01; 345/173; 340/5.51; 382/124
(58) Field of Search .............................. 341/34, 22, 20; 345/168, 173; 382/115, 124; 340/5.51, 5.74; 178/18.01

(56) References Cited

U.S. PATENT DOCUMENTS

| | | | |
|---|---|---|---|
| 4,621,334 A | | 11/1986 | Garcia .......................... 364/550 |
| 4,725,817 A | | 2/1988 | Wihlborg ...................... 340/365 |
| 4,805,222 A | * | 2/1989 | Young et al. ................ 340/5.51 |
| 5,241,308 A | | 8/1993 | Young .......................... 341/34 |
| 5,386,219 A | | 1/1995 | Greanias et al. ............ 345/174 |
| 5,451,724 A | | 9/1995 | Nakazawa et al. ............. 178/20 |
| 5,557,686 A | * | 9/1996 | Brown et al. ............... 340/5.51 |
| 5,581,484 A | * | 12/1996 | Prince ....................... 340/407.1 |
| 5,627,566 A | * | 5/1997 | Litschel ....................... 345/168 |
| 5,768,386 A | | 6/1998 | Yokomoto et al. ............. 380/24 |
| 5,982,357 A | * | 11/1999 | Burgett et al. ................. 341/22 |
| 5,987,153 A | * | 11/1999 | Chan et al. ................. 340/5.82 |
| 5,995,026 A | * | 11/1999 | Sellers ......................... 341/22 |
| 6,073,497 A | * | 6/2000 | Jiang et al. ............... 73/862.68 |
| 6,193,153 B1 | * | 2/2001 | Lambert ...................... 235/380 |
| 6,307,956 B1 | * | 10/2001 | Black ......................... 382/124 |

* cited by examiner

*Primary Examiner*—Michael Horabik
*Assistant Examiner*—Albert K. Wong
(74) *Attorney, Agent, or Firm*—Scott Charles Richardson; Kevin E. West; Suiter & Associates (57) ABSTRACT

A method for inputting an access code via temporal variations in the amount of pressure applied to a touch interface is disclosed. The method facilitates the input of access codes such as passwords, personal identification codes, and the like in a manner that is indiscernible (via either sight or sound) to third parties thereby reducing the possibility that the access codes may be copied or stolen and used a third party to gain unauthorized access to a system or function.

45 Claims, 8 Drawing Sheets

PRESSURE PASSWORD INPUT DEVICE AND METHOD

FIELD OF THE INVENTION

The present invention relates generally to systems employing user entered access codes such as passwords, personal identification numbers (PIN) and the like, and more particularly to a method for inputting such access codes via temporal variations in the amount of pressure applied to a touch interface.

BACKGROUND OF THE INVENTION

Access codes such as passwords, personal identification numbers (PIN), and the like have long been employed as a security measure to restrict access to sensitive systems and information. Such access codes are typically entered as a unique string of alphanumeric characters that a user types into a keyboard or keypad. Once entered, the access code is compared against a stored code template. If the access code is legitimate, access is provided to the user.

Because access codes are entered via a keyboard or keypad, the possibility exists that an undesired third party may discover the access code as it is typed. For example, a user of a portable computer who must enter a password to access a network, runs the risk that a third party such as a business competitor seated nearby on a commercial airplane, can discern the password as it is typed. Such a person could then use the stolen password to access the network and compromise information contained therein. Similar concerns apply to security for telephone calling cards, for example, both for prepaid and for charge cards. And, in a similar vein, a person performing banking transactions at a automated teller machine (ATM) runs the risk that a third party may discern his or her personal identification number (PIN) as it is entered into the ATM's keypad. The PIN could then be used to access the user's bank accounts.

Because of such limitations, a variety of other security methods have been developed. However, all such methods suffer similar drawbacks. For example, one such method, signature recognition, employs digitizer pads for entry of a user's signature. The signature is then compared with a stored signature template or list of signature templates. If the signature matches within a predetermined tolerance, access is provided to the user. However, software applications capable of comparing an entered signature with a stored signature template are extremely sophisticated since they must account for natural variations in the user's signature. As a result, such systems are expensive and require large amounts of memory to implement. Further, users may have concerns that a third party may be capable of forging their signatures. Similarly, other methods such as fingerprint recognition and the use of electronic keys (e.g., radio frequency identification (RFID) transponders containing an access code) utilize specialized equipment and may require sophisticated software for implementation.

SUMMARY OF THE INVENTION

Accordingly, the present invention is directed to a novel method for inputting information by temporally varying the amount of pressure applied to a touch interface such as a digitizer (touch) pad, cursor control stick, touch screen, or the like. The present invention thus facilitates the input access codes such as passwords and personal identification codes in a manner that is indiscernible (via either sight or sound) to third parties so as to reduce the possibility that the access code may be stolen and used for unauthorized access to a system or information by undesired third parties.

In accordance with a first aspect of the invention, a method for inputting an access code by temporally varying the amount of pressure applied to the touch interface is disclosed. The method includes the steps of sensing temporal variations in pressure applied to the touch interface, encoding the sensed temporal variations in pressure to generate a code, and comparing the generated code with a stored code template to determine if the code and the code template match within a predetermined tolerance. Wherein the generated code and the code template match within the predetermined tolerance, the code may be used to enable a function. Exemplary functions which may be enabled in this manner include, but are not limited to, enabling startup of an information handling system, loading an operating system, executing a software application, establishing a communication link with a network, allowing access to a restricted area, allowing a transaction via a network, and allowing banking transactions via an automatic teller machine (ATM). In an exemplary embodiment, the method may be implemented as a program of instructions storable on a medium readable by an information handling system for causing the information handling system to perform the steps of the method.

In accordance with a second aspect of the present invention, an information handling system utilizing the method is disclosed. In an exemplary embodiment, the information handling system is comprised of a processor for executing the program of instructions implementing the method of the present invention, a memory coupled to the processor for storing the program of instructions, and a touch interface coupled to the processor for sensing variations in pressure applied by a user of the information handling system for entering the access code. Exemplary touch interfaces include, resistive or capacitive digitizer pads (e.g., touch pads), cursor control sticks, mouses which include keys having pressure sensing elements, touch sensitive display overlays (e.g., touch screens), and the like.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
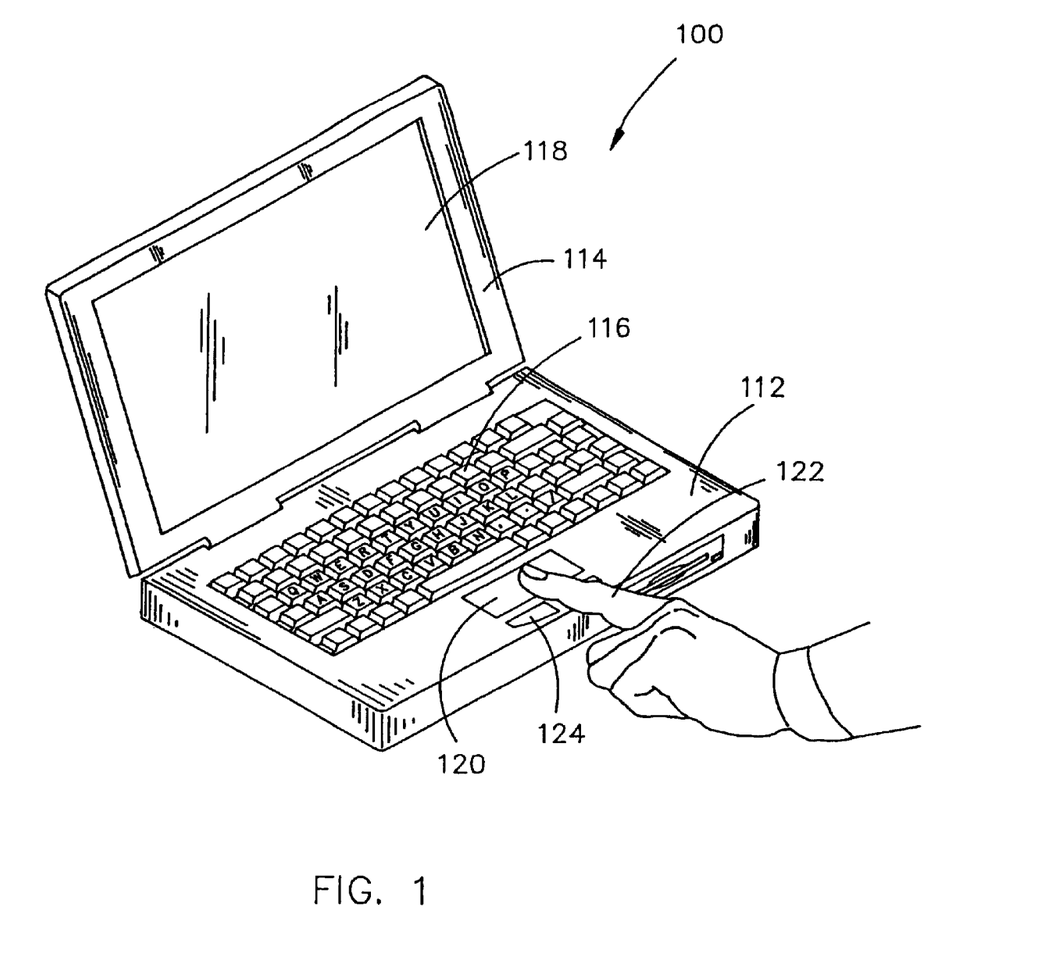
FIG. 1 is an isometric view of an exemplary information handling system having a touch interface and employing the method of the present invention for entry of an access code, wherein the touch interface is a digitizer pad.

Referring now to FIG. 1, an exemplary information handling system employing the method of the present invention is shown. In this embodiment, the information handling system is comprised of a portable computer 100, commonly referred to in the art as a laptop or notebook computer. As shown in FIG. 1, portable computer 100 includes a processor portion 112 having a keyboard 116, and a lid portion 114 including a display 118. The lid portion 114 is pivotally hinged to the processor portion 112 so that the lid portion 114 and processor portion 112 may be folded together for storage and transport of the computer 100.

Figure 2:
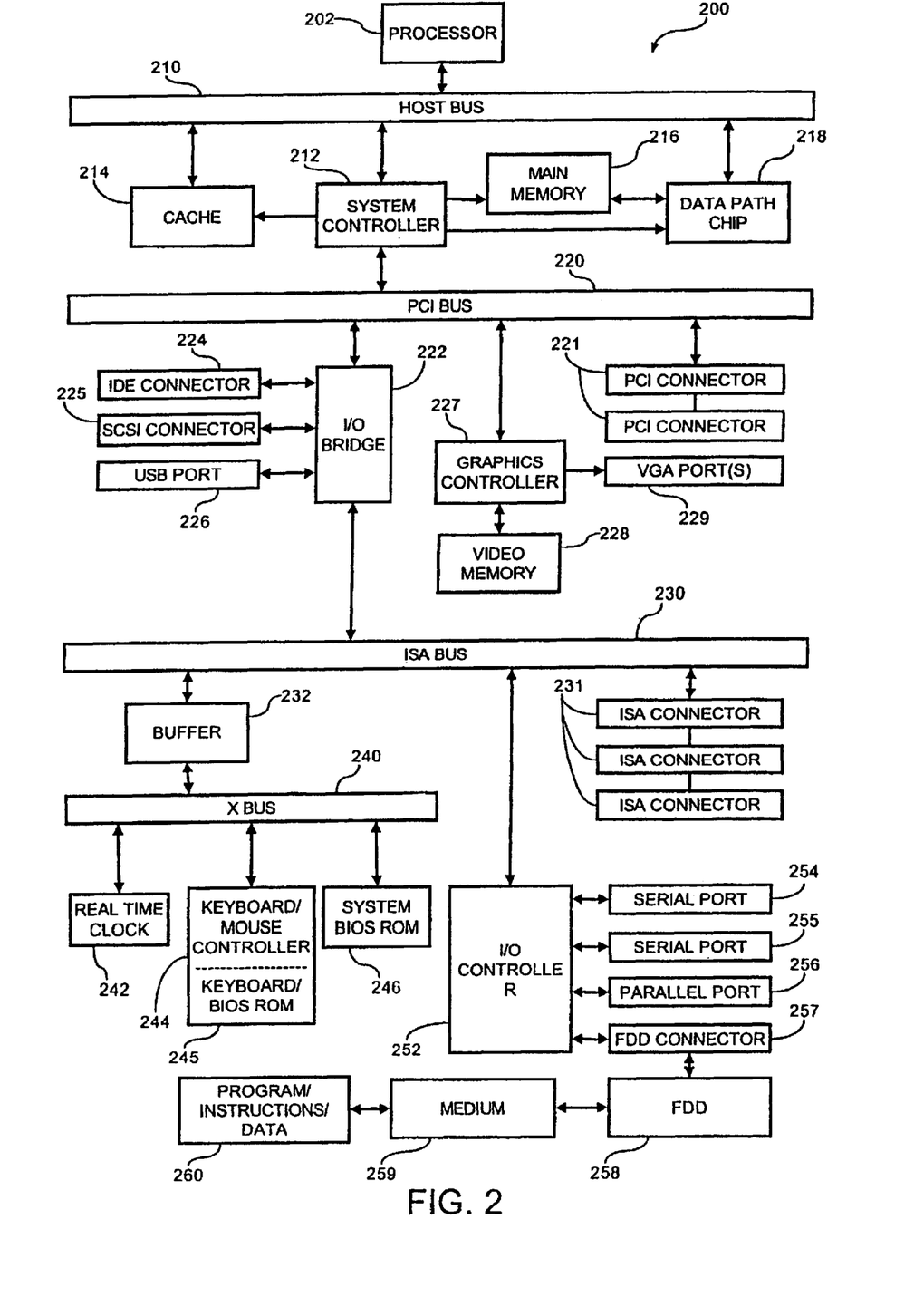
FIG. 2 is a block diagram illustrating an exemplary computer based information handling system such as the server and client information handling systems shown in FIG. 1.

An exemplary hardware architecture 200 of an information handling system such as portable computer 100 of FIG. 1 is shown in FIG. 2. In this embodiment, processor 204, system controller 212, cache 214, and data-path chip 218 are each coupled to host bus 210. Processor 204 is a microprocessor such as a 486-type chip, a Pentium 7, Pentium II7, Pentium III7, or the like suitable microprocessor. Cache 214 provides high-speed local-memory data (in one embodiment, for example, 512 KB of data) for processor 204, and is controlled by system controller 212, which loads cache 214 with data that is expected to be used soon after the data is placed in cache 212 (i.e. in the near future). Main memory 216 is coupled between system controller 212 and data-path chip 218, and in one embodiment, provides random-access memory of between 16 MB and 128 MB of data. In one embodiment, main memory 216 is provided on SIMMs (Single In-line Memory Modules), while in another embodiment, main memory 216 is provided on DIMMs (Dual In-line Memory Modules), each of which plugs into suitable sockets provided on a motherboard holding these components and many of the other components shown in FIG. 2. Main memory 216 includes standard DRAM (Dynamic Random-Access Memory), EDO (Extended Data Out) DRAM, SDRAM (Synchronous DRAM), or the like suitable memory technology. System controller 212 controls PCI (Peripheral Component Interconnect) bus 220, a local bus for system 200 that provides a high-speed data path between processor 204 and various peripheral devices, such as video, disk, network, etc. Data-path chip 218 is also controlled by system controller 212 to assist in routing data between main memory 216, host bus 210, and PCI bus 220.

In one embodiment, PCI bus 220 provides a 32-bit-wide data path that runs at 33 MHz. In another embodiment, PCI bus 220 provides a 64-bit-wide data path that runs at 33 MHz. In yet other embodiments, PCI bus 220 provides 32-bit-wide or 64-bit-wide data paths that run at higher speeds. In one embodiment, PCI bus 220 provides connectivity to I/O bridge 222, graphics controller 227, and one or more PCI connectors 221, each of which accepts a standard PCI card. In one embodiment, I/O bridge 222 and graphics controller 227 are each integrated on the motherboard along with system controller 212, in order to avoid a board-to-connector-to-board signal crossing interface and thus provide better speed and reliability. In the embodiment shown, graphics controller 227 is coupled to a video memory 228 that includes memory such as DRAM, EDO DRAM, SDRAM, or VRAM (Video Random-Access Memory), and drives VGA (Video Graphics Adapter) port 229. VGA port 229 can connect to VGA-type or SVGA (Super VGA)-type displays or the like. Other input/output (I/O) cards having a PCI interface can be plugged into PCI connectors 221.

In one embodiment, I/O bridge 222 is a chip that provides connection and control to one or more independent IDE connectors 224–225, to a USB (Universal Serial Bus) port 226, and to ISA (Industry Standard Architecture) bus 230. In this embodiment, IDE connector 224 provides connectivity for up to two or more standard IDE-type devices such as hard disk drives, CD-ROM (Compact Disk-Read-Only Memory) drives, DVD (Digital Video Disk or Digital Versatile Disk) drives, or TBU (Tape-Backup Unit) devices. In one similar embodiment, two IDE connectors 224 are provided, and each provide the EIDE (Enhanced IDE) architecture. In the embodiment shown, SCSI (Small Computer System Interface) connector 225 provides connectivity for preferably up to seven or fifteen SCSI-type devices (depending on the version of SCSI supported by the embodiment). In one embodiment, I/O bridge 222 provides ISA bus 230 having one or more ISA connectors 231 (in one embodiment, three connectors are provided). In one embodiment, ISA bus 230 is coupled to I/O controller 252, which in turn provides connections to two serial ports 254 and 255, parallel port 256, and FDD (Floppy-Disk Drive) connector 257. In one embodiment, FDD connector 257 is connected to FDD 258 that receives removable media (floppy diskette) 259 on which is stored data and/or program code 260. In one such embodiment, program code 260 includes code that controls programmable system 200 to perform the methods described herein. In another such embodiment, serial port 254 is connectable to a computer network such as the Internet, and such network has program code 260 that controls programmable system 200 to perform the methods described herein. In one embodiment, ISA bus 230 is connected to buffer 232, which is connected to X bus 240, which provides connections to real-time clock 242, keyboard/mouse controller 244 and keyboard BIOS ROM (Basic Input/Output System Read Only Memory) 245, and to system BIOS ROM 246.

FIG. 2 shows one exemplary embodiment of the present invention, however other bus structures and memory arrangements are specifically contemplated. In one embodiment, I/O bridge 222 is a chip that provides connection and control to one or more independent IDE connectors 224–225, to a USB (Universal Serial Bus) port 226, and to ISA (Industry Standard Architecture) bus 230. In this embodiment, IDE connector 224 provides connectivity for up to two standard IDE-type devices such as hard disk drives or CD-ROM (Compact Disk-Read-Only Memory) drives, and similarly IDE connector 225 provides connectivity for up to two IDE-type devices. In one such embodiment, IDE connectors 224 and 225 each provide the EIDE (Enhanced IDE) architecture. In one embodiment, I/O bridge 222 provides ISA bus 230 having one or more ISA connectors 231 (in one embodiment, three connectors are provided). In one embodiment, ISA bus 230 is coupled to I/O controller 252, which in turn provides connections to two serial ports 254 and 255, parallel port 256, and FDD (Floppy-Disk Drive) connector 257. In one embodiment, ISA bus 230 is connected to buffer 232, which is connected to X bus 240, which provides connections to real-time clock 242, keyboard/mouse controller 244 and keyboard BIOS ROM (Basic Input/Output System Read Only Memory) 245, and to system BIOS ROM 246. It should be appreciated that modification or reconfiguration of information handling system 200 of FIG. 2 by one having ordinary skill in the art would not depart from the scope or the spirit of the present invention.

Referring again to FIG. 1, portable computer 100 includes a cursor control device comprised of a touch sensitive digitizer pad 120 mounted to the processor portion 112 of portable computer 100 adjacent to keyboard 116. Such digitizer pads 120 (often referred to in the art as touch pads, track pads, etc.) sense motion of the user's fingertip 122 to control the position of a cursor or pointer on a graphical user interface (GUI) displayed on the display 118 by providing position indications corresponding to positions on the display 118.

In accordance with the present invention, digitizer pad 120 may further sense variations in pressure applied along an axis generally perpendicular to its surface. For example, in an exemplary embodiment, digitizer pad 120 comprises a resistive touch pad capable of generating an analog signal proportional to the amount of pressure applied by the user's fingertip 122. This analog signal may be converted to a digital signal via an analog to digital converter (ADC) for processing by the system's processor 202 (FIG. 2). Such resistive touch pads have conventionally been utilized to allow the user to select a point on the display 118 by either tapping or applying an added downward pressure to the surface of the touch pad. Alternately, digitizer pad 120 may be a capacitive touch pad capable of sensing variations in applied pressure by measuring the area of the user's finger tip in contact with the surface of the pad. Such capacitive touch pads are conventionally used to control "edge motion" velocity wherein a displayed cursor will continue to move when the user's fingertip is dragged to the edge of the touch pad, and the velocity of movement is controlled by the amount of pressure applied to the touch pad by the user.

The method of the present invention utilizes the digitizer pad 120 as a touch interface to provide a means for inputting an access code or password via temporal variations in the amount of pressure applied to the surface of the pad 120 by the user. In this way, the present invention facilitates entry of access codes in a manner that is substantially indiscernible (via either sight or sound) to third parties, reducing the possibility that the access code may be stolen and used for access to a system or function by unauthorized persons. In an exemplary embodiment, the method of the present invention may be implemented in an information handling system, such as portable computer 100, as a program of instructions storable on a medium readable by the information handling system for causing the information handling system to execute the steps of the method.

Figure 3A:
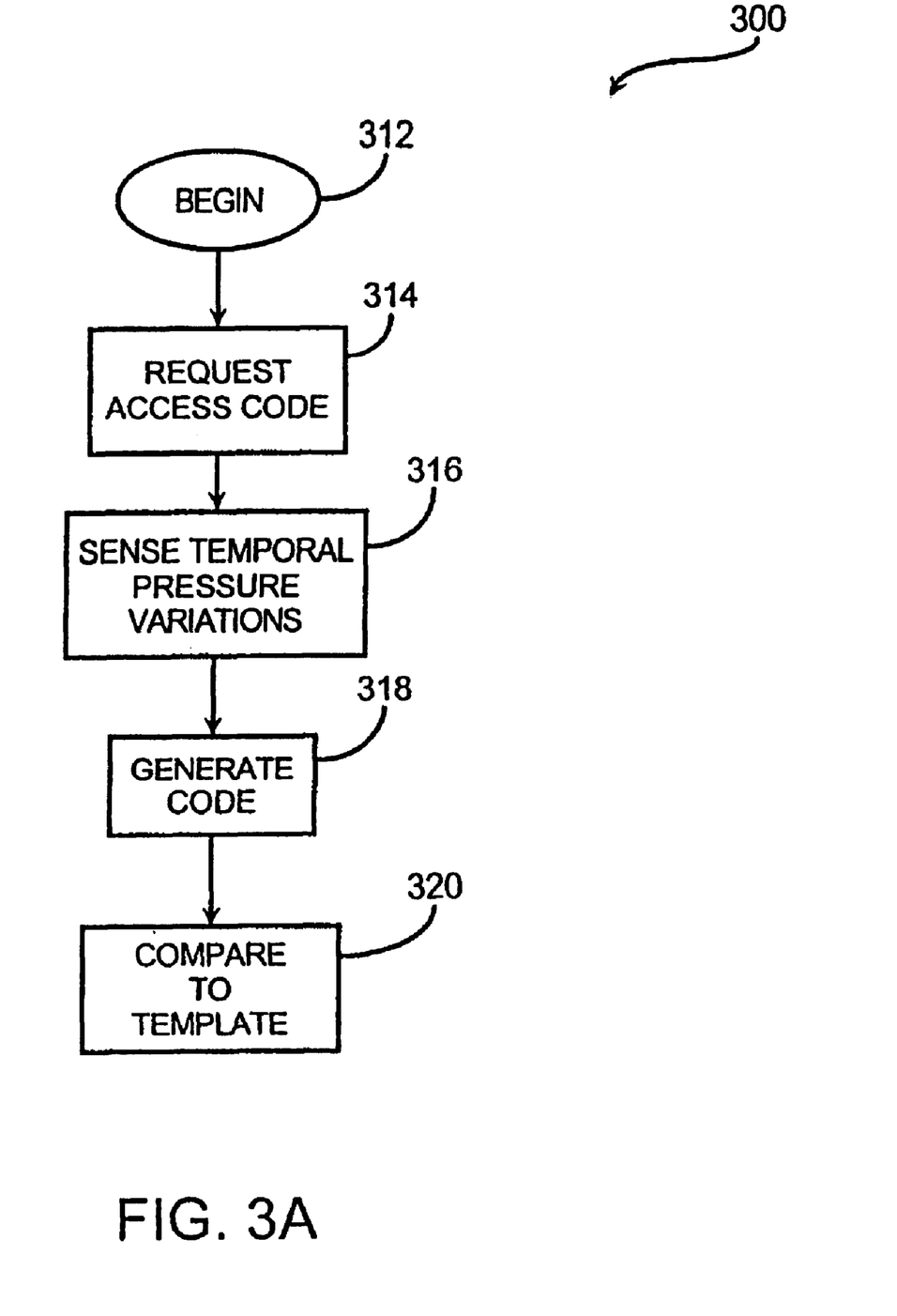
FIGS. 3A and 3B are flow diagrams illustrating methods in accordance with exemplary embodiments of the present invention.
Figure 3B:
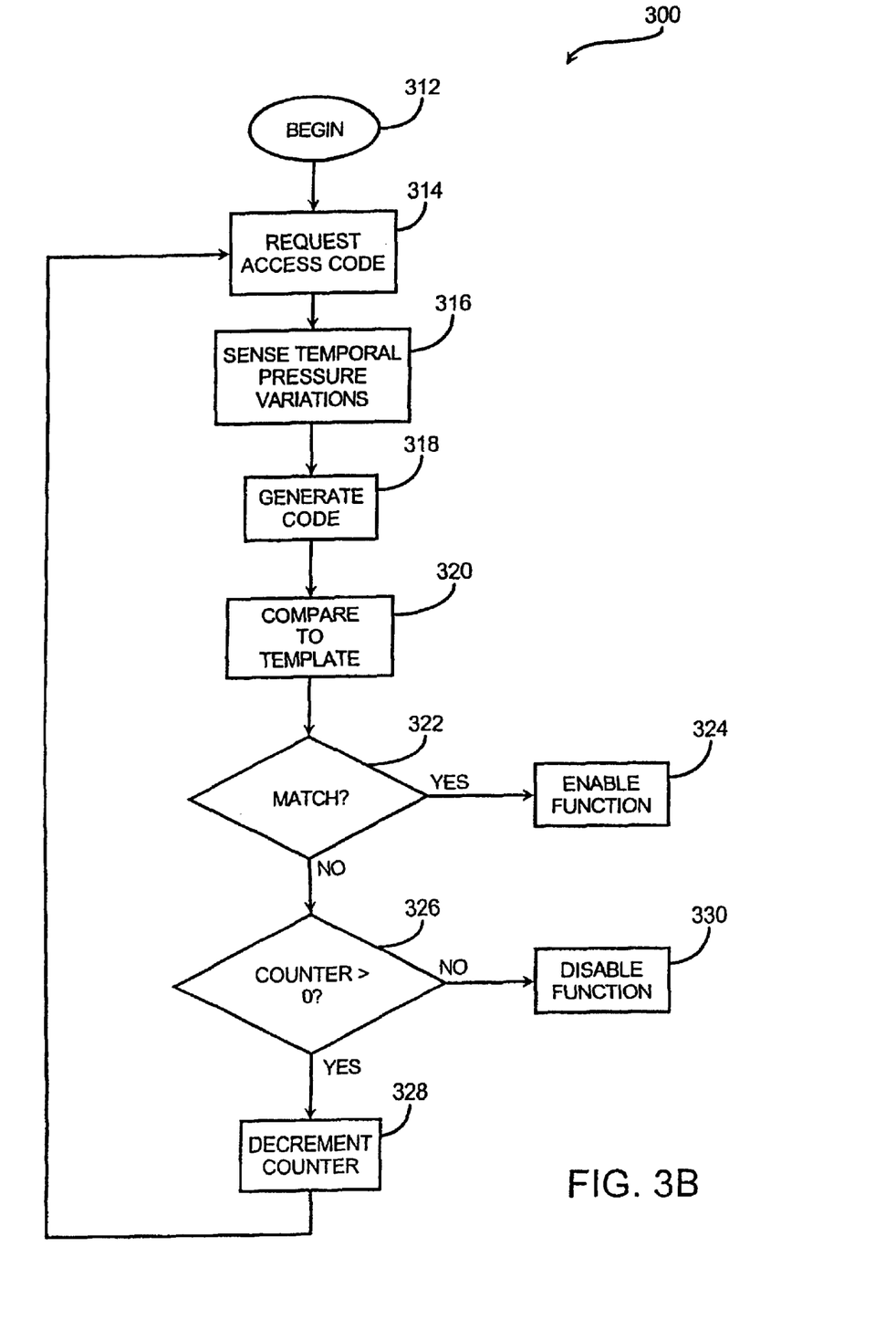

Turning now to FIGS. 3A and 3B, a method 300 in accordance with an exemplary embodiment of the present invention is shown. The method 300 is initiated, at step 312, wherein a user attempts to access a function requiring an access code such as a password or personal identification number (PIN). For example, the user may power on an information handling system such as portable computer 100 (FIG. 1) wherein the computer's operating system is password protected. Similarly, the user of portable computer 100 may attempt to access a network such as a local area network (LAN). The network may require entry of the user's password for access to network resources. Likewise, the user may attempt to access the Internet via an Internet service provider, online information service, etc wherein a legitimate user name and password is required to receive access to the network.

A request may be provided to the user to enter the access code, at step 314. This request may, for example, be displayed via display 118 of portable computer 100. Alternately, step 314 may be omitted, and the user may simply enter the access code without a prompt. The user enters the access code by temporally varying the amount of pressure applied to the touch interface. For example, wherein the touch interface is comprised of a digitizer pad 120 as shown in FIG. 1, the user would rest one or more fingers (or alternatively the point of a stylus) on the surface of digitizer pad 120 and would apply pressure in a temporal pattern. Preferably, the user would not move (e.g., flex, lift, tap, etc.) his finger while varying the amount of pressure applied to the digitizer pad 120. In this manner, entry of the access code would be essentially invisible to third parties since no motion of the user's hand could be detected.

The temporal pattern of pressure applications applied by the user is sensed by the touch interface (e.g., the digitizer pad 120), at step 316, and utilized to generate an access code, at step 318. The generated access code is then compared, at step 320, with a code template created by the user at an earlier time. In one embodiment, the user's access code itself will simply have been previously stored as the code template by the information handling system. In more general embodiments, the code template may, for example, be data structure created from the generated access code during a prior use of the information handling system. Similarly, a network server may allow a new user to choose a password the first time that user accesses the network. The password chosen would be saved by the server as the stored code template.

As shown in FIG. 3B, the entered access code may then be utilized to allow the information handling system to enable the function requested at step 312. It should be appreciated that a user may be unable to exactly duplicate the previously entered temporal pressure pattern of the code template when inputting the access code pattern. Thus, it may be necessary to allow some variation, within a predetermined tolerance, between the inputted access code and the code template. For example, wherein the access code is entered by the user as a series of pressure pulses having varying durations, a predetermined tolerance may be provided for variations in the lengths of the pulses. A determination may then be made at step 322 whether the entered access code and the stored code template match to within the predetermined tolerance. Wherein the inputted access code and the code template are a close match (i.e., they match to within the predetermined tolerance), the function is enabled at step 324.

Preferably, the user may be allowed more than one opportunity to correctly enter the access code. For example, a counter (COUNTER) may be initialized to a value (N), representing the allowable number of access code requests that may be made to the user, when the access code it first requested from the user, at step 314. A determination may then be made at step 326 whether the counter is greater than zero (0), wherein all allowed access code requests have been made. Wherein the counter (COUNTER) is greater than zero (0), the counter (COUNTER) is decremented ($COUNTER_n + 1 = COUNTER_{n-1}$), at step 328, and entry of the access code is again requested at step 314. Otherwise, the function is disabled at step 330.

The entered access code may be utilized in conjunction with other security measures. For example, the access code may be utilized to verify identifying information (e.g., a user name) entered by the user via keyboard 116. Similarly, in an exemplary embodiment, digitizer pad 120 may include an optical scanner or thermal sensor for collecting an image of the user's fingerprint as the pressure access code is entered and verified against a stored fingerprint template. Verification of both the collected fingerprint image and the access code may then be required before the user is allowed access to the system or information.

Figure 4A:
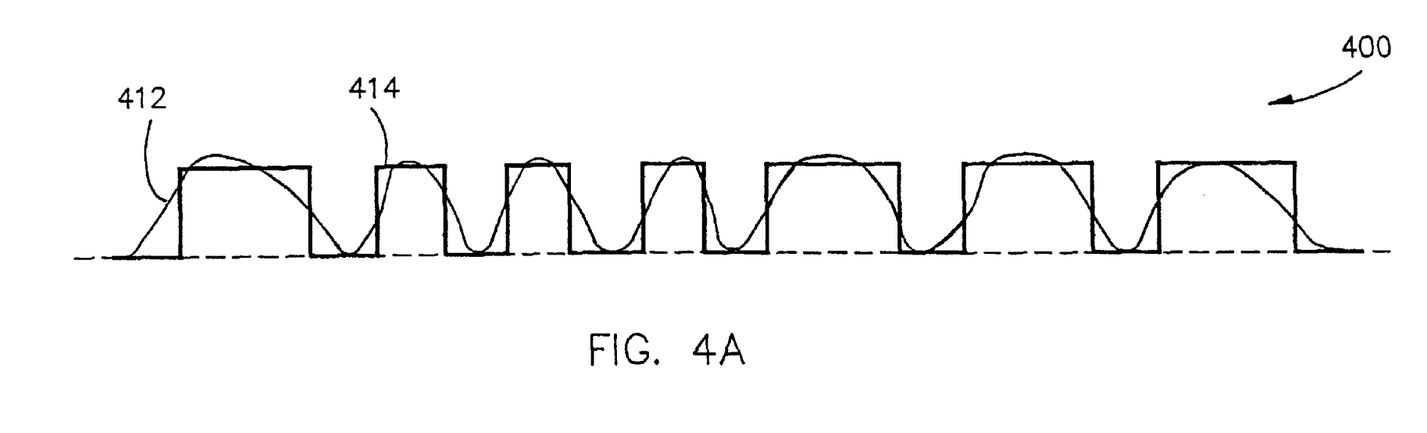
FIGS. 4A and 4B are diagrams illustrating entry of an access code via temporal pressure variation in accordance with an exemplary embodiment of the present invention.
Figure 4B:
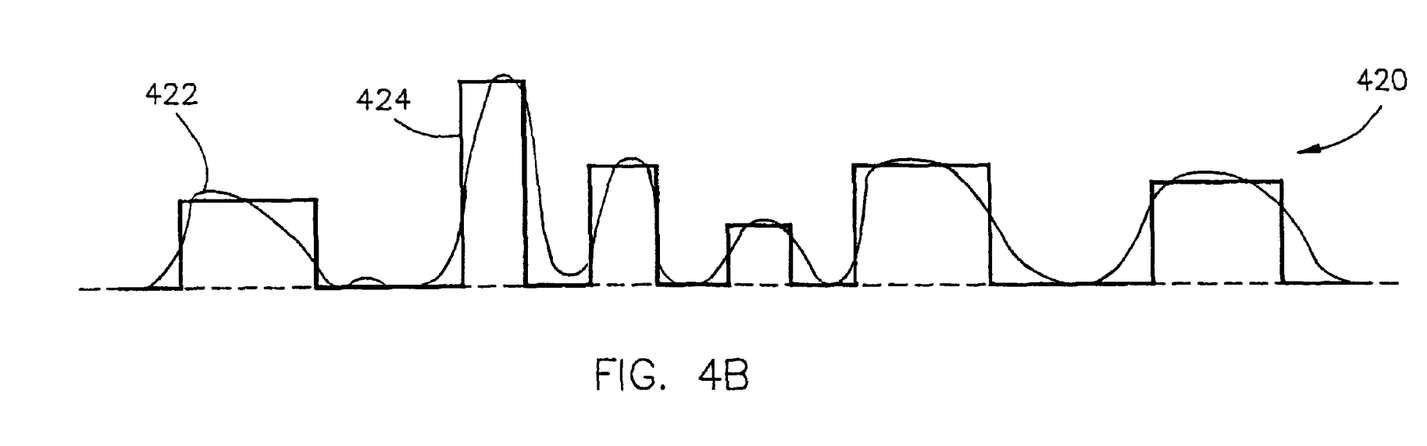

FIGS. 4A and 4B illustrate graphically access codes 400 & 420 entered by the user as a temporal series of pressure applications to a touch interface such as digitizer pad 120 (FIG.1). As they are entered, the pressure applications are sensed by the touch interface as variations in pressure relative to a baseline pressure (e.g., no application of pressure), and encoded for comparison with a stored code template. For example, digitizer pad 120, functioning as the touch interface, may generate an analog signal 412 & 422 proportional to the pressure applied to its surface by the user. The analog signal 412 & 422 may then be converted to a digital signal 414 & 424 via an analog to digital converter (ADC) or the like for comparison to a stored code template. Known rounding techniques for analog to digital conversion may be utilized to eliminate inconsistencies in entry of the access code by the user.

As shown in FIG. 4A, the touch interface may sense only temporal applications of pressure relying on timing of the pressure applications for entry of the access code. In such an embodiment, the touch interface would not detect variations in pressure magnitude or intensity. Thus, the access code would be entered as a series of alternating pressure applications of varying duration. Alternately, as shown in FIG. 4B, the touch interface may sense both temporal applications of pressure and variations in pressure magnitude or intensity. Thus, the access code would be entered as a series of alternating short and long pressure applications that vary both in duration and magnitude.

A known code key (e.g., Morse code) or a memory nemonic (e.g., the melody of a favorite song) may be utilized to aid the user in selecting, remembering, and entering the access code. Further, by using a code key such as Morse code, a conventional alphanumeric password previously entered via a keyboard or keypad may be converted into a pressure password consisting of a series of long and short pressure applications for use with the present invention.

Figure 5:
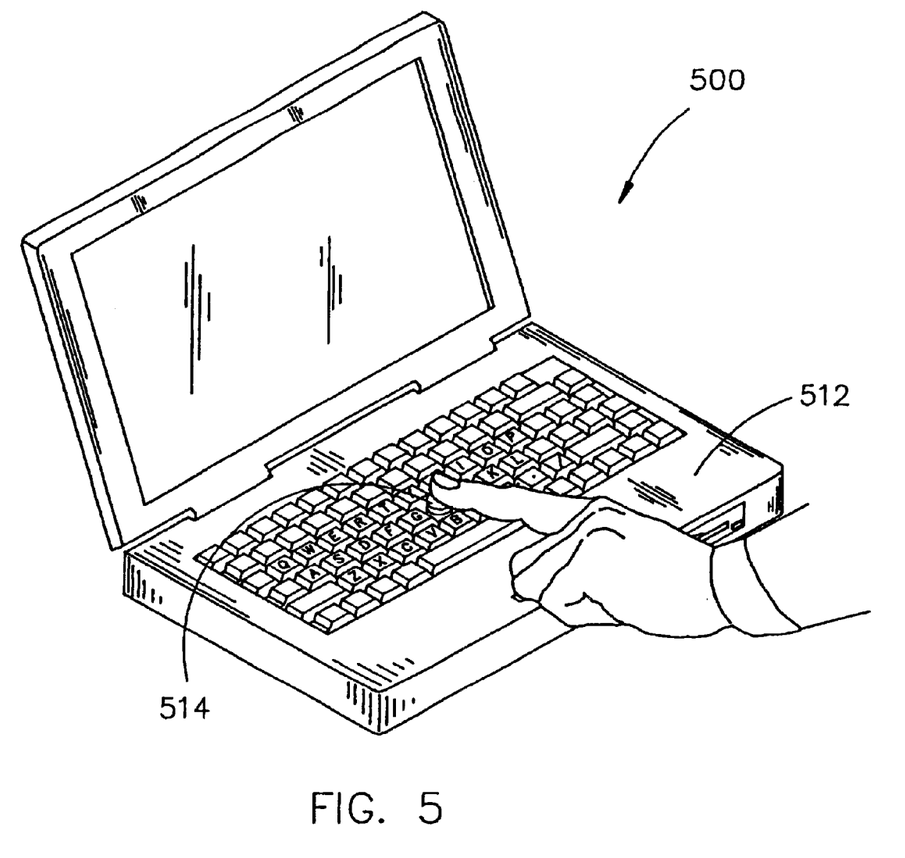
FIG. 5 is an isometric view of an exemplary information handling system wherein the touch interface is a joystick cursor control device.
Figure 6:
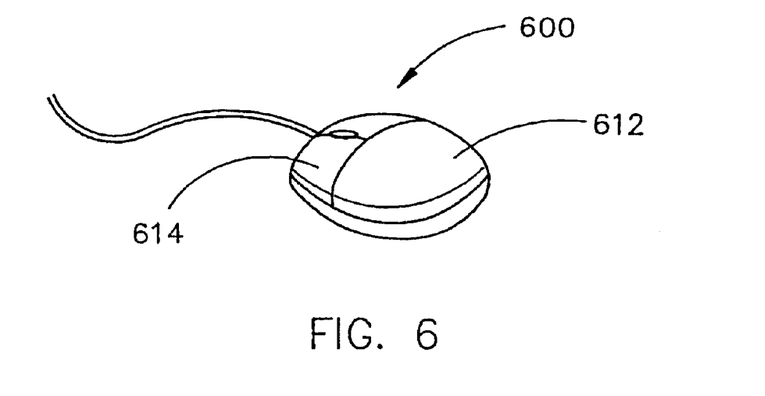
FIG. 6 is an isometric view of an exemplary information handling system wherein the touch interface is mouse.

Referring now to FIGS. 5 and 6, it should be appreciated that the present invention, when implemented in an information handling system, may utilize cursor control devices other than digitizer pad 120 (FIG. 1) as a touch interface. For example, as shown in FIG. 5, an information handling system is shown which is comprised of a portable computer 500 having a keyboard 512 employing a cursor control stick 514. In accordance with the present invention, cursor control stick 514 may sense variations in force or pressure applied along a "Z" axis perpendicular to keyboard 512. In this manner, cursor control stick 514 may be utilized as a touch interface to facilitate entry of access codes in accordance with the method of the present invention. For instance, in an exemplary embodiment, cursor control stick 514 may include a force sensitive resister (not shown) suitable for generating an analog signal proportional to the force applied by the user. The user would rest a finger on the cursor control stick 514 and apply a downward pressure in a temporal pattern. Preferably, cursor control stick, while being capable of sensing variations in force along the "Z" axis, would not itself move along the "Z" axis so that the user's finger would not move while entering the access, and entry of the access code would thus not be discernable to third parties.

Similarly, as shown in FIG. 6, an information handling system such as a desktop personal computer, convergence system, etc., may employ a mouse 600 having a mouse body 612 and at least one key 614 including a force sensitive element (e.g., a force sensitive resister, etc.) functioning as a touch interface for implementation of the method of the present invention. The user, to input a pressure access code via such a mouse, would rest a finger on key 614, fully depress key 614, and apply downward pressure in a temporal pattern. Preferably, once key 614 is fully depressed, the force sensitive element would be capable of sensing variations in pressure applied to the key without additional movement of the key 614 by the user's finger tip. In an alternative embodiment, the mouse may employ a sensor disposed in the cavity receiving the mouse ball, operable to detect, by the receipt of upward pressure of the mouse ball, downward pressure upon the mouse by the user. In either of these embodiments using the system mouse, entry of the access code would not be discernable to third parties.

Figure 7:
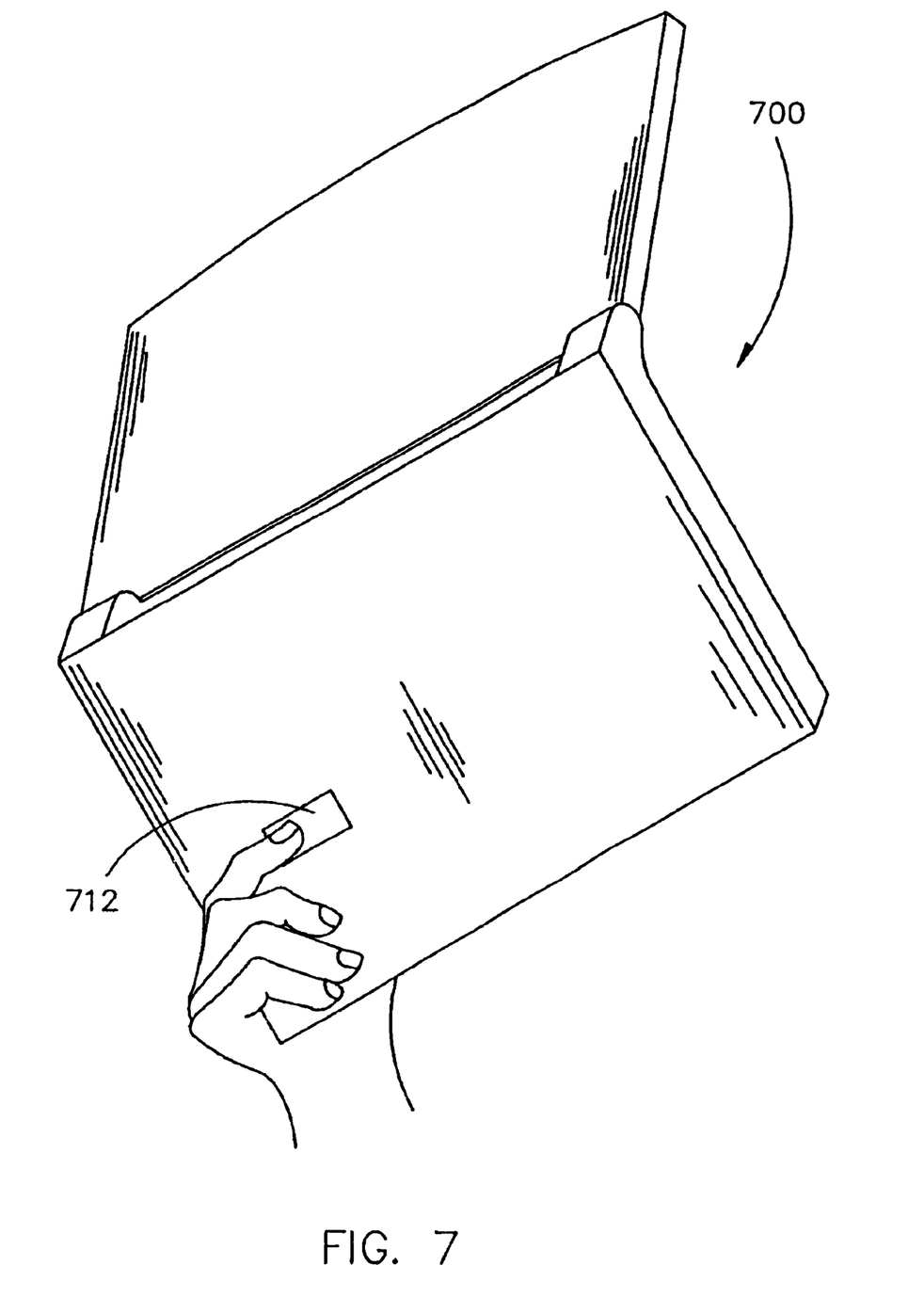
FIG. 7 is an isometric view of an exemplary information handling system wherein the touch interface is a digitizer pad mounted to the bottom surface of the system housing.

Referring now to FIG. 7, it should further be appreciated that the present invention, when implemented in an information handling system, may utilize a touch interface other than the information handling system's cursor control device. For instance, as shown in FIG. 7, an information handling system comprised of a portable computer 700 is shown having a touch interface 712 mounted to a bottom surface of its housing. Preferably, the touch interface 712 is positioned so that it is effectively shielded from the view of third parties by the computer's housing, thereby reducing the likelihood that access codes entered by the user may be discerned by third parties.

Figure 8:
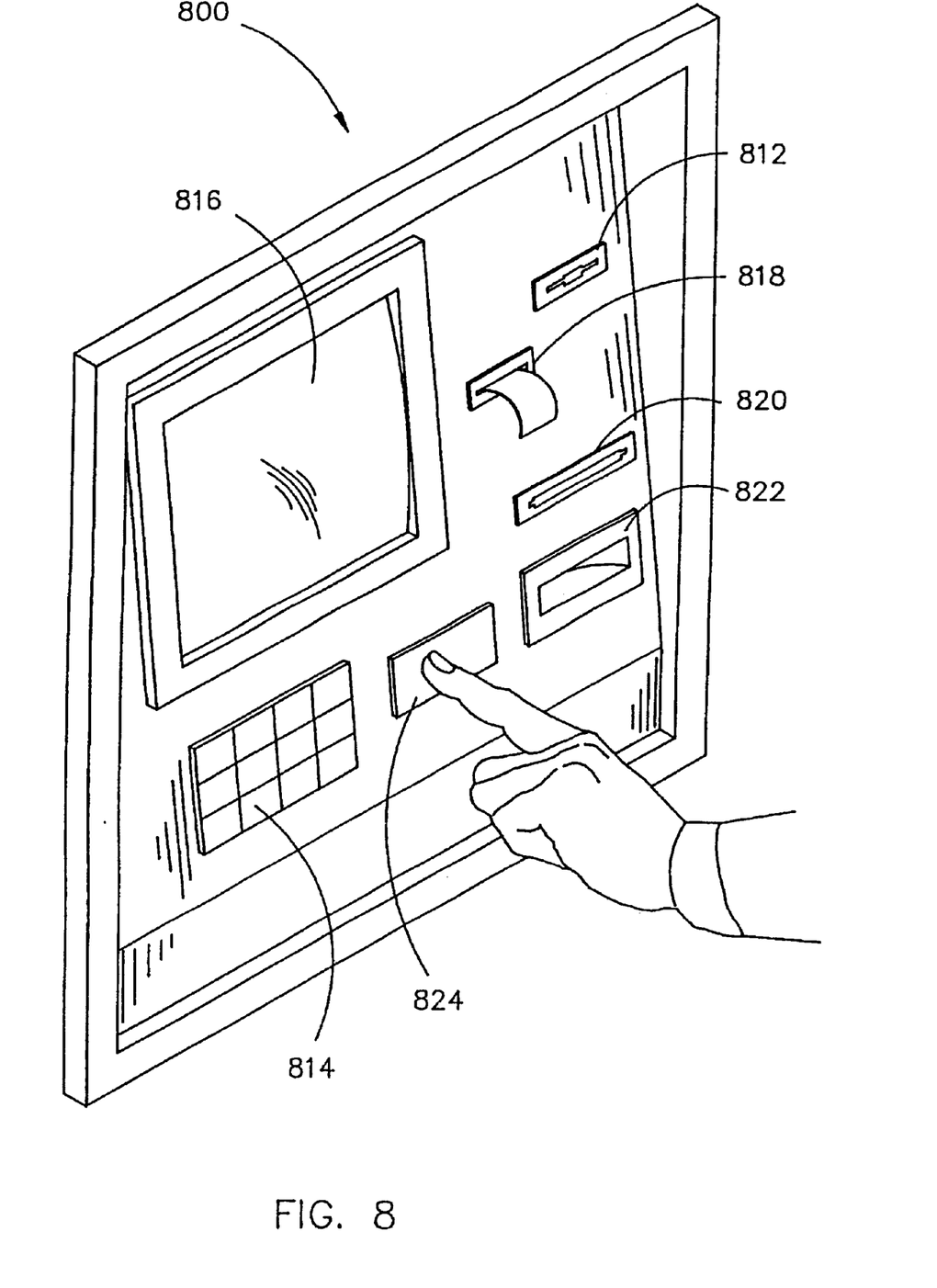
FIG. 8 is an isometric view of an automated teller machine (ATM) employing the present invention.

Referring now to FIG. 8, it will be apparent to those skilled in the art that the method of the present invention may be utilized by information handling systems in a wide variety of applications which in the past have employed keyboard or keypad entered access codes. For example, as shown in FIG. 8, the method of the present invention may be utilized by an automated teller machine (ATM) 800 to prevent third parties near the ATM, for example, standing in line behind the user, from discerning a user's personal identification number (PIN) as it is entered. ATM 800 is preferably comprised of an information handling system that is highly specialized for performing banking and banking related transactions. Thus, a typical ATM 800 may include many of the elements of the hardware architecture 200 of FIG. 2 such as, for example, processor 204, system controller 212, cache 214, data-path chip 218, and host bus 210. Such an ATM 800 may also include components for interfacing with banking customers such as a magnetic card slot 812 for receiving a magnetically encoded ATM card, a keypad 814, a display 816, a printer 818 for printing transaction receipts, and slots for distributing money and receiving deposit envelopes 820 & 822.

In an exemplary embodiment, ATM 800 may be provided with a touch interface for entry of the user's personal identification number (PIN). As shown in FIG. 8, the touch interface may comprise a separate digitizer pad 824 mounted to the ATM so as to be easily accessible by the user. Alternately, the touch interface may comprise a touch sensitive overlay (or touch screen) to display 816 that is capable of sensing temporal variations in pressure applied to the display 816 by the user.

It is believed that the method of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for inputting a code by temporally varying the amount of pressure applied to a touch interface wherein the code may be used to enable a function, the method comprising the steps of
sensing temporal variations in pressure applied to the touch interface;
encoding the sensed temporal variations in pressure to generate a single code based on the sensed pressure over the temporal period; and
comparing the generated code with a stored code template to determine if the generated code and the code template match within a predetermined tolerance.

2. A method as recited in claim 1, further comprising the steps of:
wherein the generated code and the code template match within the predetermined tolerance, enabling the function; else
disabling the function.

3. A method as recited in claim 2, wherein the function comprises at least one of enabling startup of an information handling system, loading an operating system, executing a software application, establishing a communication link with a network, allowing access to a restricted area, allowing a transaction via a network, and allowing a business transactions via an automatic teller machine (ATM).

4. A method as recited in claim 1, wherein the sensing step comprises generating an analog signal proportional to the temporal variations in pressure and the encoding step comprises converting the generated analog signal to a digital signal corresponding to the code.

5. A method as recited in claim 4, wherein the sensing step further comprises detecting variance in magnitudes of the sensed temporal variations in pressure applied to the touch interface.

6. A method as recited in claim 1, further comprising the step of applying a plurality of temporal variations in pressure to the touch interface wherein the touch interface allows application of pressure without discernable movement and sound.

7. A method as recited in claim 1, further comprising the steps of:
generating an image of a fingerprint collected from a finger of a subject generating the temporal variations in pressure, and
comparing the generated fingerprint image with a stored fingerprint template to determine if the generated fingerprint image and stored fingerprint template match with a predetermined tolerance.

8. A method as recited in claim 7, further comprising the steps of:
wherein the generated code and the code template match within the predetermined tolerance, enabling the function and the generated fingerprint image and stored fingerprint template match with a predetermined tolerance, enabling the function; else
disabling the function.

9. A method as recited in claim 8, wherein the function comprises at least one of enabling startup of an information handling system, loading an operating system, executing a software application, establishing a communication link with a network, allowing access to a restricted area, allowing a transaction via a network, and allowing a business transaction via an automatic teller machine (ATM).

10. A program of instructions storable on a medium readable by an information handling system for causing the information handling system to execute steps for inputting a code via a touch interface of the information handling system, the steps comprising:
sensing temporal variations in pressure applied to the touch interface;
encoding the sensed temporal variations in pressure to generate a single code based on the sensed pressure over the temporal period; and
comparing the generated code with a stored code template to determine if the generated code and the code template match within a predetermined tolerance.

11. A program of instructions as recited in claim 10, further comprising the steps of:
wherein the generated code and the code template match within the predetermined tolerance, enabling the function; else
disabling the function.

12. A program of instructions as recited in claim 11, wherein the function comprises at least one of enabling startup of an information handling system, loading an operating system, executing a software application, establishing a communication link with a network, allowing access to a restricted area, allowing a transaction via a network, and allowing a business transactions via an automatic teller machine (ATM).

13. A program of instructions as recited in claim 10, wherein the sensing step comprises generating an analog signal proportional to the temporal variations in pressure and the encoding step comprises converting the generated analog signal to a digital signal corresponding to the code.

14. A program of instructions as recited in claim 13, wherein the sensing step further comprises detecting variance in magnitudes of the sensed temporal variations in pressure applied to the touch interface.

15. A program of instructions as recited in claim 10, wherein the touch interface allows application of temporal variations in pressure without discernable movement and sound.

16. A program of instructions as recited in claim 10, further comprising the steps of:
generating an image of a fingerprint collected from a finger of a subject generating the temporal variations in pressure, and
comparing the generated fingerprint image with a stored fingerprint template to determine if the generated fingerprint image and stored fingerprint template match with a predetermined tolerance.

17. A program of instructions as recited in claim 16, further comprising the steps of:
wherein the generated code and the code template match within the predetermined tolerance, enabling the function and the generated fingerprint image and stored fingerprint template match with a predetermined tolerance, enabling the function; else
disabling the function.

18. A program of instructions as recited in claim 17, wherein the function comprises at least one of enabling startup of an information handling system, loading an operating system, executing a software application, establishing a communication link with a network, allowing access to a restricted area, allowing a transaction via a network, and allowing a business transactions via an automatic teller machine (ATM).

19. An information handling system, comprising:
 a processor for executing a program of instructions on the information handling system;
 a memory coupled to the processor for storing the program of instructions executable by the processor; and
 a digitizer pad coupled to the processor for sending temporal variations in pressure applied thereto;
 wherein the program of instructions configures the information handling system to input a code via temporal variations in the amount of pressure applied to the digitizer pad.

20. An information handling system as recited in claim 19, wherein the program of instructions further causes the inputted code to be compared with a code template stored in the memory to determine if the code and the code template match within a predetermined tolerance.

21. An information handling system as recited in claim 20, wherein the program of instructions enables a function of the information handling system if the inputted code and the code template match within the predetermined tolerance.

22. An information handling system as recited in claim 21, wherein the function comprises at least one of enabling startup of an information handling system, loading an operating system, executing a software application, and allowing access to a restricted area.

23. An information handling system as recited in claim 19, further comprising a communication device suitable for connecting the information handling system to a network.

24. An information handling system as recited in claim 23, wherein the program of instructions further causes the inputted code to be communicated with the network via the communication device to be compared with a code template wherein a determination is made whether the code and the code template match within a predetermined tolerance.

25. An information handling system as recited in claim 20, wherein the program of instructions enables a function of the information handling system if the inputted code and the code template match within the predetermined tolerance.

26. An information handling system as recited in claim 25, wherein the function comprises at least one of establishing a communication link between the information handling system and the network, allowing a transaction via the network.

27. An information handling system as recited in claim 25, wherein the information handling system is an automatic teller machine (ATM) and the function comprises allowing a banking transaction.

28. An information handling system as recited in claim 19, wherein the digitizer pad is suitable for detecting variance in magnitudes of the sensed temporal variations in pressure applied to the touch interface.

29. An information handling system as recited in claim 19, wherein the digitizer pad allows application of temporal variations in pressure without discernable movement and sound.

30. An information handling system as recited in claim 19, wherein the digitizer pad is suitable for capturing an image of a fingerprint used to apply pressure thereto.

31. An information handling system as recited in claim 19, wherein the digitizer pad comprises a resistive digitizer pad suitable for sensing temporal variations in applied pressure.

32. An information handling system as recited in claim 19, wherein the digitizer pad comprises a capacitive digitizer pad suitable for sensing temporal variation in applied pressure.

33. An information handling system as recited in claim 19, wherein the digitizer pad comprises a cursor control stick suitable for sensing temporal variation in applied pressure.

34. An information handling system, comprising:
 means for executing a program of instructions on the information handling system;
 means coupled to the executing means, for storing the program of instructions executable by the executing means; and
 means, coupled to the executing means, for sensing variations in pressure applied to a digitizer pad; wherein the program of instructions configures the information handling system to input a code via temporal variations in the amount of pressure applied to the digitizer pad for inputting a password.

35. An information handling system as recited in claim 34, wherein the program of instructions further causes the inputted code to be compared with a code template stored in the storage means to determine if the code and the code template match within a predetermined tolerance.

36. An information handling system as recited in claim 35, wherein the program of instructions enables a function of the information handling system if the inputted code and the code template match within the predetermined tolerance.

37. An information handling system as recited in claim 36, wherein the function comprises at least one of enabling startup of an information handling system, loading an operating system, executing a software application, and allowing access to a restricted area.

38. An information handling system as recited in claim 34, further comprising means for communicating with a network.

39. An information handling system as recited in claim 38, wherein the program of instructions further causes the inputted code to be communicated with the network by the communication means to be compared with a code template wherein a determination is made whether the code and the code template match within a predetermined tolerance.

40. An information handling system as recited in claim 39, wherein the program of instructions enables a function of the information handling system if the inputted code and the code template match within the predetermined tolerance.

41. An information handling system as recited in claim 40, wherein the function comprises at least one of establishing a communication link between the information handling system and the network and allowing a transaction via the network.

42. An information handling system as recited in claim 40, wherein the information handling system is an automatic teller machine (ATM) and the function comprises allowing a banking transaction.

43. An information handling system as recited in claim 34, wherein the pressure variation sensing means is suitable for detecting variance in magnitudes of the sensed temporal variations in pressure applied thereto.

44. An information handling system as recited in claim 34, wherein the digitizer pad allows application of temporal variations in pressure without discernable movement and sound.

45. An information handling system as recited in claim 34, wherein the digitizer pad is suitable for capturing an image of a fingerprint used to apply pressure thereto.

* * * * *